(12) United States Patent
Hosoi

(10) Patent No.: US 7,212,709 B2
(45) Date of Patent: May 1, 2007

(54) OPTICAL WAVEGUIDE DEVICE AND OPTICAL WAVEGUIDE MODULE

(75) Inventor: Toru Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/167,290

(22) Filed: Jun. 28, 2005

(65) Prior Publication Data

US 2006/0002657 A1 Jan. 5, 2006

(30) Foreign Application Priority Data

Jul. 2, 2004 (JP) ............... 2004-196422

(51) Int. Cl.
*G02B 6/34* (2006.01)
(52) U.S. Cl. ............... 385/37; 385/15; 385/31; 385/39; 385/50
(58) Field of Classification Search ............ 385/37, 385/15, 31, 39, 50
See application file for complete search history.

(56) References Cited

U.S. PATENT DOCUMENTS 5,745,618 A     4/1998   Li
6,591,044 B2 *  7/2003   Kashihara et al. ............ 385/51
6,892,004 B1 *  5/2005   Yu ............................... 385/39
7,006,729 B2 *  2/2006   Wang et al. .................. 385/37

\* cited by examiner

*Primary Examiner*—Jennifer Doan
(74) *Attorney, Agent, or Firm*—Dickstein Shapiro LLP

(57) ABSTRACT

An object of the present invention is to provide an optical waveguide device and an optical waveguide module having the function to multiplex/demultiplex or couple/decouple optical signals and particularly to provide an optical waveguide device and an optical waveguide module for realizing low optical loss, reducing wavelength dependence and ensuring easier shape management in the manufacturing and inspection processes. The optical waveguide device and optical waveguide module are provided with a substrate, one or more first waveguides, a plurality of second waveguides, and a slab waveguide for connecting the first waveguides and the second waveguides. At a region where the second waveguides are connected to the slab waveguide, a plurality of waveguide paths are provided for respectively connecting the second waveguides. Width of the waveguide paths is constant. The width of the separation gap between waveguide paths progressively increases as it becomes further away from the slab waveguide.

24 Claims, 13 Drawing Sheets

(b) MAGNIFIED DIAGRAM OF PART A  (c) MAGNIFIED DIAGRAM OF PART B (a) LINEAR  (b) EXPONENTIAL FUNCTION  (c) n-TH ORDER FUNCTION

OPTICAL WAVEGUIDE DEVICE AND OPTICAL WAVEGUIDE MODULE

BACKGROUND OF THE INVENTION

1. Field of the Invention

The present invention relates to an optical waveguide device used for optical communication and an optical waveguide module modified from the same optical waveguide device. Particularly, the present invention relates to an optical waveguide device and an optical waveguide module having the functions for multiplexing/demultiplexing or coupling/decoupling optical signals to reduce optical loss thereof.

2. Description of Related Art

In optical communication, further expansion of transmission capacity is expected. Accordingly, a wavelength division multiplexing optical transmitting method has widely been used because of its comparatively easier expandability in the transmission capacity. In recent years, further improvement in the degree of wavelength multiplexing is requested in the wavelength division multiplexing optical transmitting method. As a key device to realize such method, an optical multiplexing/demultiplexing element has been proposed. An arrayed waveguide grating type optical multiplexing/demultiplexing element is formed in a passive structure to enable multiplexing/demultiplexing of a plurality of wavelengths. This element is characterized in low loss, high extinction ratio, and narrow-band pass.

A basic structure of a general arrayed waveguide grating of the related art is illustrated in FIG. 1. This general type arrayed waveguide grating of the related art is constituted by forming, on a substrate 51, a input waveguide array 52, an output waveguide array 53, a channel waveguide array (diffraction gating) 54, a first slab waveguide 55 for connecting the input waveguide array 52 and the channel waveguide array 54, and a second slab waveguide 56 for connecting the channel waveguide array 54 and the output waveguide array 53. The channel waveguide array 54 is set in its length to become sequentially longer with the predetermined difference ΔL in lengths of the waveguides. In this array waveguide grating, the wavelength multiplexing optical signals $\lambda_1$ to $\lambda_m$ (m is a positive integer) inputted from an end of the input waveguide array 52 are divided into optical signals $\lambda_1, \lambda_2, \ldots, \lambda_m$ of every wavelength and are then outputted from the end of the output waveguide array 53 in the opposite side. On the contrary, the optical signals $\lambda_1, \lambda_2, \ldots, \lambda_m$ of every wavelength inputted from the end of the output waveguide array 53 is multiplexed into the wavelength multiplexing signals $\lambda_1$ to $\lambda_m$ and are then outputted from the end of the input waveguide array 52 in the opposite side.

As explained above, the optical communication based on the wavelength multiplexing optical transmitting system is requested in these years to satisfy the requirements such as higher wavelength multiplexing rate, higher transmission rate, and longer transmission distance. Accordingly, the array waveguide grating has been expected to realize increase in the transmission distance and further reduction in transmission loss in view of improving capability for multiplexing/demultiplexing of optical signals.

An example of the technique for assuring low loss of an array waveguide grating, which has been proposed in the related art such as the U.S. Pat. No. 5,745,618 (particularly, FIG. 7), is illustrated in FIG. 2. The array waveguide grating of the related art is respectively provided with transition regions 71, 72 immediately adjacent to the boundary between the channel waveguide array (diffraction grating) 760 and the first slab waveguide 710 and to the boundary between the channel waveguide array 760 and the second slab waveguide 720. These transition regions 71, 72 are formed through orthogonal intersection of waveguide paths $a_1$ to $a_n$ (n is a positive integer) to the channel waveguide array 760.

Structures of the optical couplers in the related art are illustrated in FIG. 3A to FIG. 3C. FIG. 3A shows a structure of an ordinary star coupler. This star coupler is formed in the structure attained by cutting the structure of the array waveguide grating of FIG. 1 explained above at the center thereof. This single composition does not have the function for multiplexing/demultiplexing wavelength multiplexing optical signals but the function to coupling or decoupling optical signals. This star coupler is also requested to realize low optical transmission loss like the array waveguide grating explained above. FIG. 3B shows a structure attained by implementing the low loss technique which has been proposed as the related art for such a star coupler. In the case of this structure, a transition region 202 is provided immediately adjacent to the boundary between the output waveguide array 206 and the slab waveguide 200 like the array waveguide grating explained above. In addition, the similar low loss technique is also proposed for a splitter. Structure of this splitter is illustrated in FIG. 3C. This splitter is also provided with a transition region 302.

These transition regions are formed, as illustrated in FIG. 4, through orthogonal intersection of waveguide paths $a_1$ to $a_n$ to the waveguide array. Width $W(a_x)_{x=1\ to\ n}$ of the waveguide path is wide immediately adjacent to the slab waveguide but progressively decrease as it becomes further away from the slab waveguide. Meanwhile, the period Λ in formation of the waveguide path is constant.

In more practical, the width $W(a_x)_{x=1\ to\ n}$ of the waveguide path gradually decreases to $W(a_n)$: 2 μm from $W(a_1)$: 18 μm as it becomes further away from the slab waveguides 710, 200. On the other hand, a separation gap between the adjacent waveguide paths (width of separation) $W(s_x)_{x=1\ to\ n}$ progressively increases to $W(s_n)$: 18 μm from $W(s_1)$: 2 μm as it becomes further away from the slab waveguides 710, 200. The relationship among the width $W(a_x)$ of the waveguide path, the separation gap $W(s_x)$, and the period Λ for arrangement of the waveguide paths satisfy the formula (1). The period Λ is 20 μm.

$$W(a_x)+W(s_x)=\Lambda,\ x=1\ to\ n \tag{1}$$

The channel waveguide array 760 (or the output waveguide array 206) is different to a large extent from the slab waveguides 710, 200 in the distribution of electric field of the light to be propagated (mode profile). Therefore, matching error of mode profile is generated in the area immediately adjacent to the boundary. Such matching error will cause an optical coupling loss. Accordingly, such matching error can be eased by eliminating abrupt change in the mode profile. As a result, optical coupling loss can be decreased.

In this related art, transition regions 71, 202 are provided. Width of these waveguide paths $W(a_x)$ progressively decreases as it becomes further away from the slab waveguides 710, 200. Therefore, the mode profile is changed step by step to avoid abrupt change thereof. Accordingly, matching error of mode profile is eased and optical coupling loss is lowered.

In this related art, it is explained that the period Λ is not required to be a constant and the width of the waveguide path is not required to be linearly decreased. However, it is explained that essential condition to attain the merits of the invention is that the width $W(a_x)$ of the waveguide path progressively decreases as it becomes further away from the slab waveguide.

As explained above, in the related art proposes realized low optical loss, the waveguide paths are provided at a part of the channel waveguide array immediately adjacent to the slab waveguide as illustrated in FIG. 2. Thereby, optical coupling loss is lowered. However, such optical coupling loss may be reduced than that in the ordinary array waveguide grating illustrated in FIG. 1 but a problem rises here, in which it is difficult to attain large reduction effect. The reason is that the waveguide path changes to narrow path from wide path as it becomes further away from the slab waveguide. The waveguide path has the effect to capture again the scattering light leaked between waveguides into the waveguide array. However, at the wider part of waveguide path, radiation of light from the waveguide array to the outside thereof through the waveguide path also occurs simultaneously. This phenomenon triggers the event that the scattering light captured by the waveguide path does not stay at the waveguide array and is radiated again to the outside of waveguide array via the waveguide path. As a result, a problem occurs here, that the scattering lights captured cannot be coupled within the waveguide array. Therefore, the structure of the array waveguide grating of the related art illustrated in FIG. 2 has a limit in the effect in realization of low loss.

As illustrated in FIG. 4, the waveguide paths are formed in the equal period in the structure of the related art. As a result, only the specific wavelength easily receives adverse effect. Accordingly, it may occur that the characteristic changes depending on every specific wavelength. Moreover, width of the waveguide path progressively decreases as it becomes further away from the slab waveguide. Therefore, an additional problem occurs here, in which shape management of each waveguide path becomes difficult in the manufacture and testing.

As illustrated in FIGS. 3A to 3C, a similar problem is also generated in the low loss technique for star coupler and splitter of the related art.

SUMMARY OF THE INVENTION

An object of the present invention is to provide an optical waveguide device and an optical waveguide module which can easily realize low loss, reduction of wavelength dependence, and shape management in the manufacturing and testing processes.

According to an exemplary aspect of the present invention, an optical waveguide device of the present invention includes a substrate, one or more first waveguides arranged on the substrate, a plurality of second waveguides arranged on the substrate, and a slab waveguide arranged on the substrate to connect the first waveguide and the second waveguide. The second waveguides are provided with a plurality of waveguide paths for connecting the second waveguides respectively at the region close to the slab waveguide. Width of each of the waveguide paths is equal and width of a separation gap between the adjacent waveguide paths progressively increases as it becomes further away from the slab waveguide. As explained above, in the optical waveguide device of the present invention, the width of the waveguide paths is constant and the width (separation gap) of the gaps between the adjacent waveguide paths progressively increases.

Moreover, according to another exemplary aspect of the present invention, an optical waveguide device of the present invention includes a substrate, one or more first waveguides arranged on the substrate, a plurality of second waveguides arranged on the substrate, and a slab waveguide arranged on the substrate to connect the first waveguide and the second waveguide. The second waveguides are provided with a plurality of waveguide paths for connecting the second waveguides respectively at the region close to the slab waveguide. Width of each of the waveguide paths is equal and period in arrangement interval of the waveguide paths progressively increases as it becomes further away from the slab waveguide. As explained above, in the optical waveguide device of the present invention, the width of the waveguide paths is equal and the period in arrangement interval of the waveguide paths progressively increases.

Moreover, according to still another exemplary aspect of the present invention, an optical waveguide device of the present invention includes a substrate, one or more first waveguides arranged on the substrate, a channel waveguide array arranged on the substrate with a plurality of waveguides and formed so that the length of each waveguide progressively increases in the step of the predetermined difference in the length of waveguides, a plurality of second waveguides arranged on the substrate, a first slab waveguide arranged on the substrate to connect the first waveguides and the channel waveguide array, and a second slab waveguide arranged on the substrate to connect the channel waveguide array and the second waveguides. The channel waveguide array is provided with a plurality of waveguide paths for connecting waveguides of the channel waveguide array respectively at least one of the regions close to the first slab waveguide and close to the second slab waveguide. Width of each of the waveguide paths is equal and width of the separation gap between the adjacent waveguide paths progressively increases as it becomes further away from the slab waveguide of the side arranged the waveguide paths. As explained above, in the optical waveguide device of the present invention, the width of the waveguide paths is equal and the width (separation gap) of the gaps between the adjacent waveguide paths progressively increases.

According to still another exemplary aspect of the present invention, an optical waveguide device of the present invention includes a substrate, one or more first waveguides arranged on the substrate, a channel waveguide array arranged on the substrate with a plurality of waveguides and formed so that the length of each waveguide progressively increases in the step of the predetermined difference in the length of waveguides, a plurality of second waveguides arranged on the substrate, a first slab waveguide arranged on the substrate to connect the first waveguides and the channel waveguide array, and a second slab waveguide arranged on the substrate to connect the channel waveguide array and the second waveguides. The channel waveguide array is provided with a plurality of waveguide paths for connecting waveguides of the channel waveguide array respectively at least one of the regions close to the first slab waveguide and close to the second slab waveguide. Width of the waveguide paths is equal and period in arrangement interval of the waveguide paths progressively increases at it becomes further away from the slave waveguide of the side arranged the waveguide paths. As explained above, in the optical waveguide device of the present invention, the width of the waveguide paths is equal and the period in arrangement interval of the waveguide paths progressively increases.

According to yet another exemplary aspect of the present invention, an optical waveguide module of the present invention includes the optical waveguide device explained above, one or more first optical fibers connected to the first waveguides, a plurality of second optical fibers connected to the second waveguides, and a case for housing these elements. As explained above, the optical waveguide module of the present invention is provided with the optical waveguide device having the characteristics explained above.

BRIEF DESCRIPTION OF THE DRAWINGS

The exemplary aspects, features and advantages of the present invention will become more apparent from the following detailed description when taken in conjunction with the accompanying drawings wherein:

FIGS. 3A to 3C are plan views of optical couplers of the related art, in which FIG. 3A is a general star coupler, FIG. 3B is a start coupler to which the low loss technique is implemented and FIG. 3C is a plan view of a power splitter to which the low loss technique is implemented;

FIGS. 8A to 8B are characteristic diagrams illustrating periods of waveguide paths in the first exemplary embodiment of the present invention, in which FIG. 8A is an example in which the period increases in the form of a linear function and FIG. 8B is an example in which the period increases in the form of an exponential function;

FIGS. 11A to 11B are transmissive spectrum diagrams illustrating effect of the low loss technique using the array waveguide grating of the first exemplary embodiment of the present invention, in which FIG. 11A is the entire part of the transmissive spectrum diagram and FIG. 11B is an magnified view of the shape of top of the main lobe;

FIGS. 12A to 12B are plan views of a second exemplary embodiment and a third exemplary embodiment of the present invention, which FIG. 12A is a plan view of a star coupler and FIG. 12B is a plan of a splitter; and FIGS. 13A to 13B are structural diagrams of an array waveguide grating type optical module of the present invention, in which FIG. 13A is a plan view of the same optical module and FIG. 13B is a side elevation diagram of the same module when a case is cut.

DETAILED DESCRIPTION OF THE EXEMPLARY EMBODIMENTS

The exemplary embodiments of the present invention will be explained with reference to the accompanying drawings.

First, a structure of an array waveguide grating will be explained as a first exemplary embodiment of the present invention.

Figure 5:
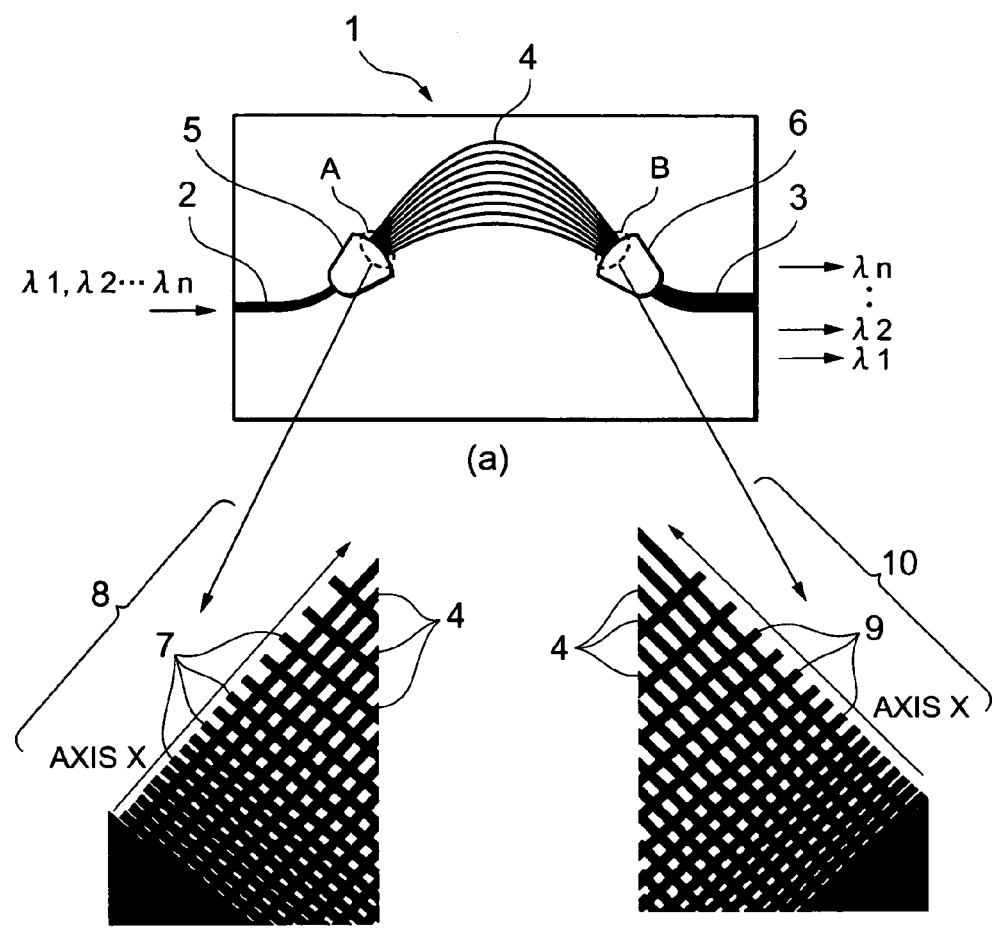
FIG. 5 is a plan view of an array waveguide grating as a first exemplary embodiment of the present invention, in which (a) is a perspective view of the entire part, (b) is a magnified view of the part A and (c) is a magnified view of the part B.

FIG. 5 is a plan view of the array waveguide grating of the first exemplary embodiment of the present invention, in which illustration (a) is a perspective view of the entire part, illustration (b) is a magnified diagram of the part A, and illustration (c) is a magnified diagram of the part B. The basic structure of this exemplary embodiment is constituted by forming, on a substrate 1, one or more input channel waveguides 2, a plurality of output channel waveguides 3, a channel waveguide array 4, a first slab waveguide 5 for connecting the input channel waveguides 2 and the channel waveguide array 4, and a second slab waveguide 6 for connecting the channel waveguide array 4 and the output channel waveguides 3. The channel waveguide array 4 is formed of several tens to several hundreds of waveguides. The length of these waveguides is set to progressively increase with the predetermined difference ΔL in the length thereof. Moreover the part A, which is the boundary between the first slab waveguide 5 and the channel waveguide array 4, is formed in the mesh type as illustrated in (b) of FIG. 5. This mesh type part forms a mode conversion region 8 under the condition that the channel waveguide array 4 intersects a plurality of waveguide paths 7. Similarly, the part B, which is the boundary between the second slab waveguide 6 and the channel waveguide array 4, is also formed in the mesh type as illustrated in (c) of FIG. 5. This mesh type part also forms a mode conversion region 10 under the condition that the channel waveguide array 4 intersects a plurality of waveguide paths 9.

Next, mesh type structures of these portions A and B will then be explained in detail.

Figure 6:
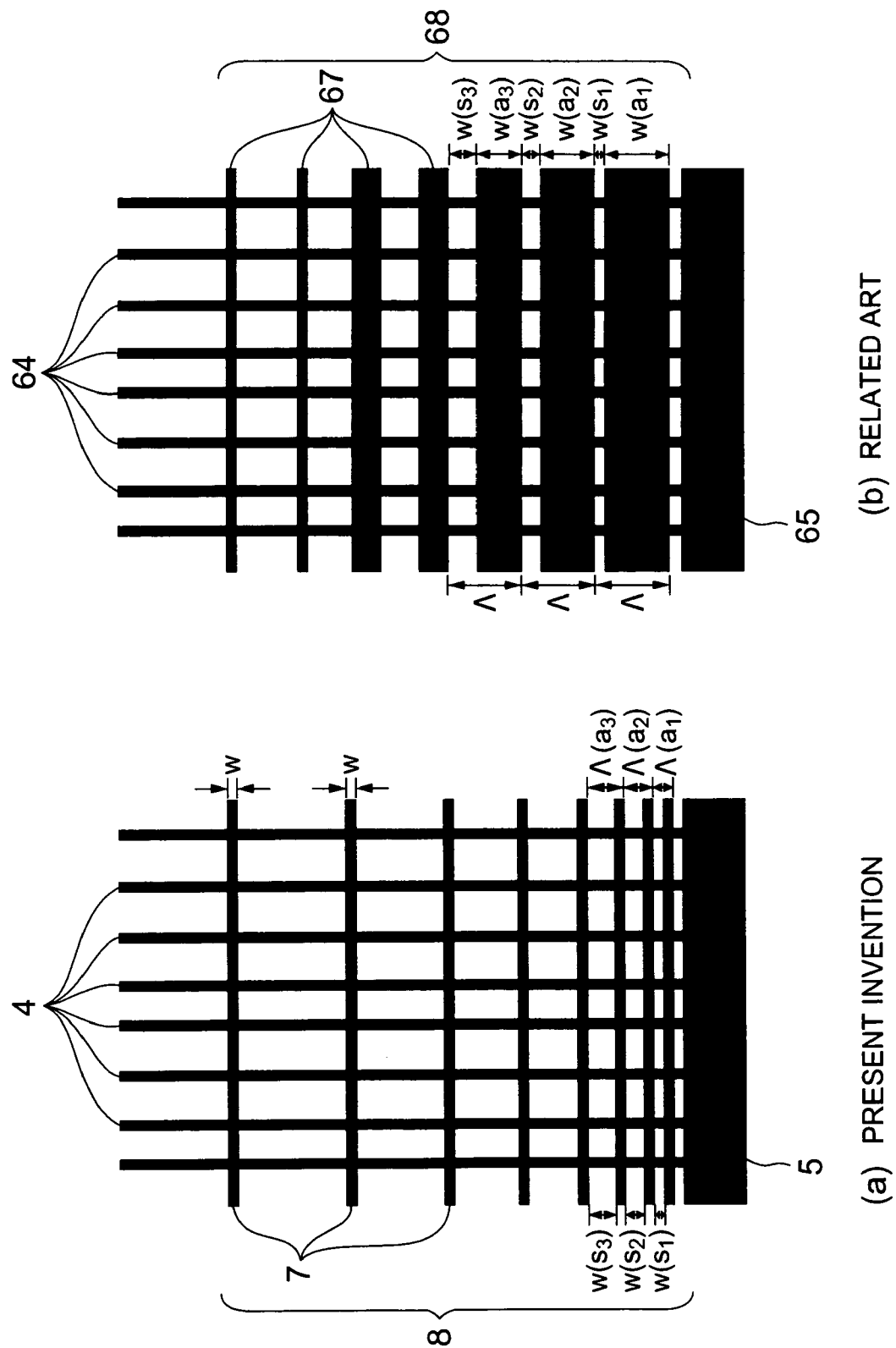
FIG. 6 is a schematic diagram for comparison of mesh type waveguide paths in the first exemplary embodiment of the present invention with the related art, in which (a) is a schematic diagram of the waveguide paths of the present invention and (b) is a schematic diagram of the waveguide paths of the related art.

FIG. 6 is a schematic diagram of the mesh type waveguide paths in the first exemplary embodiment of the present invention in comparison with the related art. Illustration (a) is the plan view of the mesh type waveguide paths in the present invention, while illustration (b) is the plan view of that in the related art. As illustrated in these drawings, in the waveguide paths 7 in the present invention, the width W is uniform, while the width $W(s_x)$ of the separation gap between the adjacent waveguide paths progressively increases as it becomes further away from the slab waveguide. Otherwise, the period $\Lambda(a_x)$ in arrangement of waveguide paths progressively increases as it becomes further away from the slab waveguide. On the other hand, in the related art in which the waveguide path is provided similarly, the width $W(a_x)$ of the waveguide paths 67 is large in the part immediately adjacent to the slab waveguide and progressively decreases as it becomes further away from the slab waveguide. The period Λ is constant. Particularly, the widths $W(a_{1 \ to \ 3})$ of the waveguide paths 67 at the part immediately adjacent to the slab waveguide are considerably large in comparison with the width of each waveguide of the channel waveguide array 64. Meanwhile, the width W of the waveguide path in the present invention is set to the value which is almost equal to that of each waveguide of the channel waveguide array 4.

Figure 7:
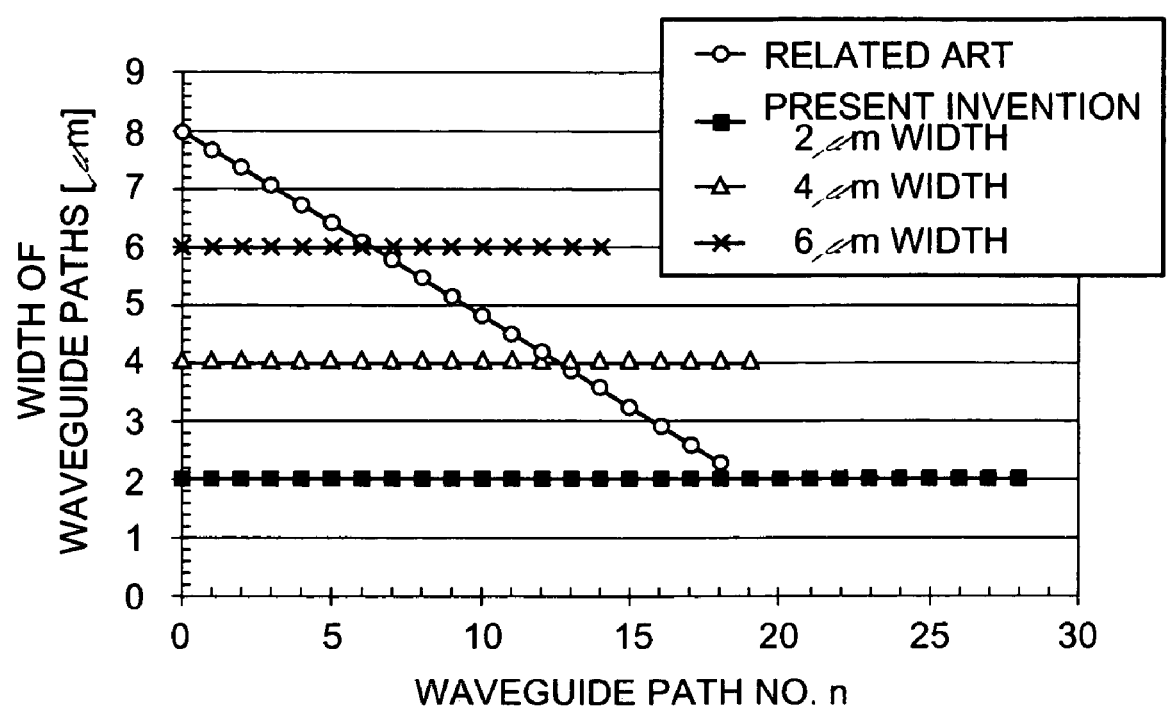
FIG. 7 is a graph showing changes in the width of waveguide path in the first exemplary embodiment of the present invention.

FIG. 7 is a graphic illustration showing changes in the width of waveguide paths. The waveguide path number counted from the slab waveguide is graduated on the horizontal axis. The width of waveguide paths is graduated on the vertical axis. As will be understood from this graphic illustration, the width $W(a_x)$ of the waveguide path (67 in FIG. 6) is large at the part immediately adjacent to the slab waveguide and progressively decreases as it becomes further away from the slab waveguide in the related art. On the other hand, the width W of the waveguide path (7 in FIG. 6) is constant (for examples, 2 μm, 4 μm or 6 μm, etc.) not depending on n (waveguide path number).

Figure 8A:
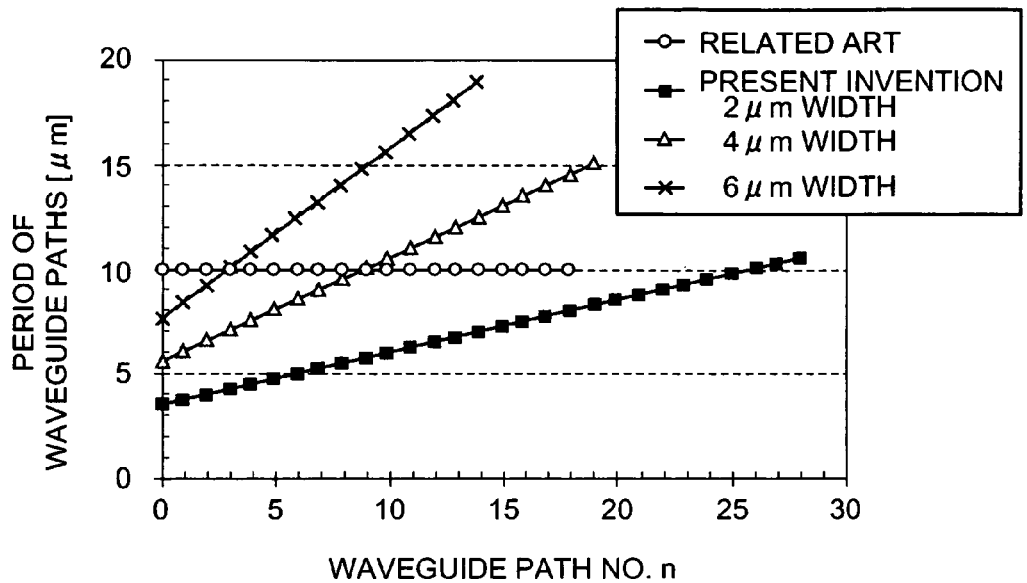
Figure 8B:
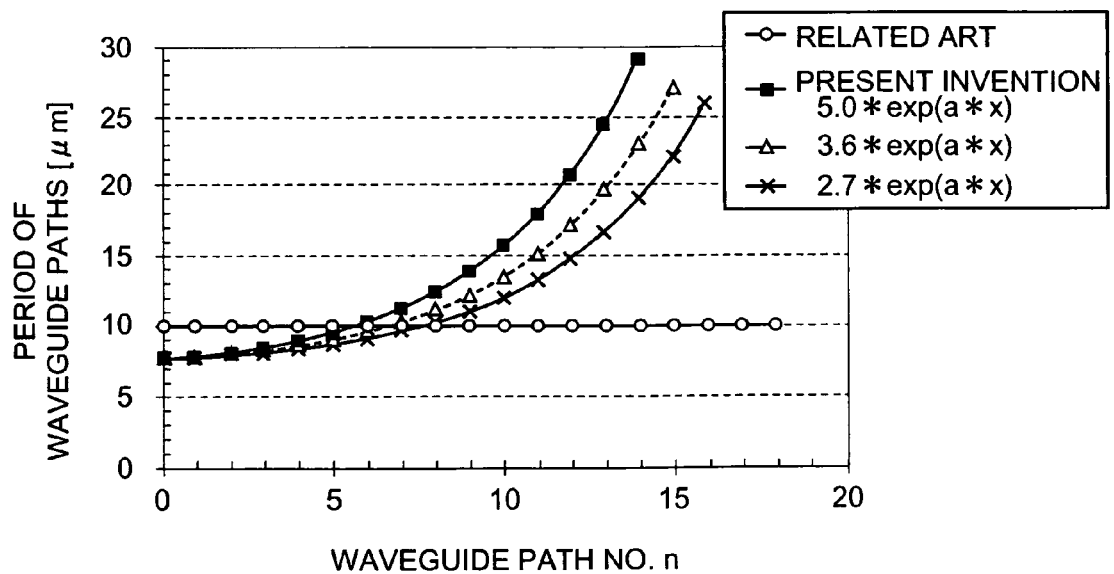

FIGS. 8A to 8B are characteristic diagrams showing changes in the period to form waveguide paths. The waveguide path number is plotted on the horizontal axis like FIG. 7. The period formed the waveguide paths is plotted on the vertical axis. FIG. 8A shows an example of the periods which linearly increases. And FIG. 8B shows an example thereof which exponentially increases.

Figure 9:
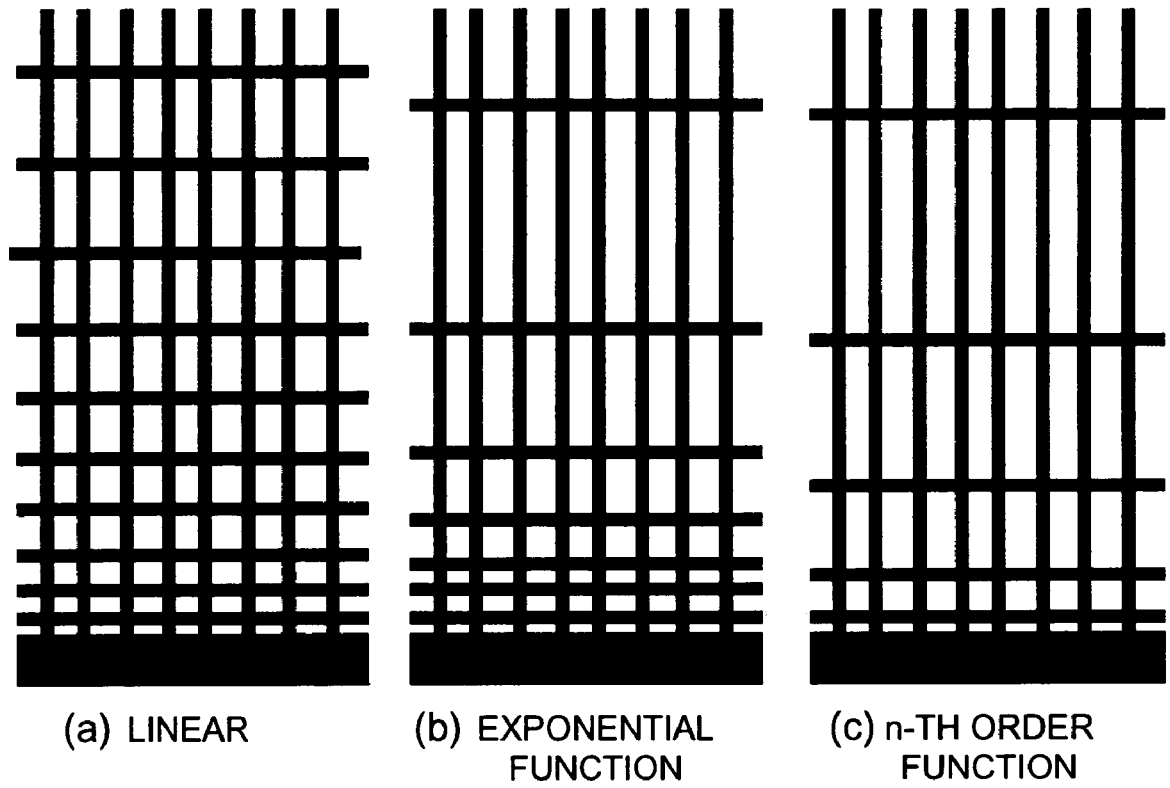
FIG. 9 is a schematic diagram illustrating the period of waveguide paths in the first exemplary embodiment of the present invention, in which (a) shows an example in which the period increases in the form of a linear function, (b) shows an example in which the period increases in the form of an exponential function, and (c) shows an example in which the period increases in the form of an n-th order function (n is an integer 2 or larger)

FIG. 9 is a schematic diagram showing changes in the period to form the waveguide paths in the exemplary embodiment of the present invention. Illustration (a), (b), and (c) respectively illustrate the examples showing the periods which increase linearly, in accordance with an exponential function, and in accordance with an n-th order function (n is the integer equal to or larger than 2).

Here, the period of waveguide path is a constant value Λ not depending on n in the related art in opposition to the width of waveguide path. Meanwhile, in the present invention, the period $\Lambda(a_x)$ of waveguide path progressively increases as it becomes further away from the slab waveguide.

Moreover, it is preferable, to attain further merits of the present invention, that the width W of waveguide path, gap (separation gap) $W(s_x)$ between the adjacent waveguide paths and period $\Lambda(a_x)$ satisfy the following formula (2).

$$\Lambda(a_x) - W(s_x) = W, x = 1 \text{ to } n \quad (2)$$

When each waveguide width of the channel waveguide array is 4 μm, as the just suitable design example, the width W becomes about 1 μm to 6 μm.

Next, an example of material and manufacturing method of the array waveguide grating in the first exemplary embodiment of the present invention will be explained below.

As the substrate on which optical waveguides are formed, a semiconductor substrate formed of silicon, a substrate of glass material (silica glass substrate), and a compound semiconductor substrate are used. As the first step, a lower clad layer is deposited on a substrate in the several tens of μm using a glass material of silica-type to which phosphorus, germanium, titanium, boron, or fluorine is doped. As the deposition method, the flame deposition hydrolysis method, atmospheric pressure CVD (chemical vapor deposition) method, sputtering method, spin coating method, or electron beam evaporation method is used. Next, a material of silica-type glass to which an impurity of high index of refraction such as germanium is doped in the amount larger than that of the lower clad layer is deposited in the thickness of about 3 to 8 μm. Accordingly, a core layer of the refraction index which is higher than that of the lower clad layer may be formed. In addition, on the basis of the design of the present invention, a waveguide circuit as illustrated in (a) to (c) of FIG. 5 is fabricated. The photolithography is employed for fabrication of the waveguide circuit. Ultra-fine regions are transferred to an adequate mask material and subsequently unwanted regions are eliminated with the dry-etching method. For elimination of unwanted regions, a reactive on etching (RIE) apparatus and a reactive ion beam etching (RIBE) apparatus or the like are used. Finally, as an upper clad layer, a material of silica-type glass of the refraction index which is lower than that of the core layer is deposited again in the thickness of several tens of micrometers. It is enough to use a material which is optical transparent as the material of core, clad, and buffer layer. These elements may also be fabricated with a glass material, dielectric material, semiconductor material, and organic material, in addition to silica-type glass.

Next, operations of the array waveguide grating of the first exemplary embodiment of the present invention will be explained.

First, the basic operations of the array waveguide grating will be explained. As illustrated in FIG. 5, the wavelength-multiplexed optical signals $\lambda_1$ to $\lambda_m$ are inputted to the input channel waveguide 2 with an optical fiber or the like from the left side of the substrate 1. Next, the wavelength-multiplexed optical signals $\lambda_1$ to $\lambda_m$ are propagated in the scattering fashion in the first slab waveguide 5 and are then coupled to each waveguide of the channel waveguide array 4. Next, the wavelength-multiplexed optical signals $\lambda_1$ to $\lambda_m$ guided to each waveguide of the channel waveguide array 4 generates, as explained above, a phase difference corresponding to difference of waveguide ΔL. Thereafter, the wavelength-multiplexed optical signals $\lambda_1$ to $\lambda_m$ reach the boundary to the second slab waveguide 6. Next, the wavelength-multiplexed optical signals $\lambda_1$ to $\lambda_m$ are diffracted and propagated with the second slab waveguide 6 and then reach the output channel waveguide 3. Since diffraction angles of the wavelength-multiplexed optical signals $\lambda_1$ to $\lambda_m$ are different in accordance with wavelength, these optical signals are converged to different output channel waveguides 3 respectively. Accordingly, the wavelength-multiplexed optical signals $\lambda_1$ to $\lambda_m$ are wavelength-demultiplexed. Therefore, the optical signals $\lambda_1, \lambda_2, \ldots, \lambda_m$ of individual wavelength are outputted from the right side of the substrate 1.

Next, operations in the boundary between the slab waveguide and the channel waveguide array will be explained.

In the structure of the present invention illustrated in (a) of FIG. 6, the mesh type mode conversion region 8 is provided. This region 8 is provided to prevent generation of optical loss generated by difference in the mode profile of the slab waveguide 5 and the channel waveguide array 7. A part of the optical signals inputted to the channel waveguide array 7 from the slab waveguide 5 is not coupled with the channel waveguide array 4 due to difference in the mode profile. Therefore, apart of the optical signals is radiated as the scattering light.

This scattering light forms an optical coupling loss. However, in the present invention, the mode conversion region 8 is provided. Accordingly, the radiated scattering light is trapped with the waveguide paths 7 and is then coupled again with the channel waveguide array 4. Therefore, the optical coupling loss can be reduced.

Moreover, in the mode conversion region 8 of the present invention, the period in arrangement of the waveguide paths 7 is not constant unlike the related art illustrated in (b) of FIG. 6. The period $\Lambda(a_x)$ in arrangement of waveguide paths progressively increases as it becomes further away from the slab waveguide 5. Therefore, it may be eliminated that only the particular wavelength is influenced and the generation of the wavelength dependence also be controlled. In the structure of the present invention, the width W of waveguide path is kept constant by ruling out the wider areas from which the light may be radiated easily ((b) of FIG. 6, for example, lower part W ($a_{1\ to\ 3}$) of the waveguide paths 67). Accordingly, the scattering light trapped by the waveguide paths 7 is never radiated again to the outside through the waveguide paths 7. Accordingly, this light is kept in the trapped state within the waveguide array 4. As a result, low optical loss may be realized.

Next, characteristic result of the array waveguide grating of the first exemplary embodiment of the present invention will be explained.

Figure 1:
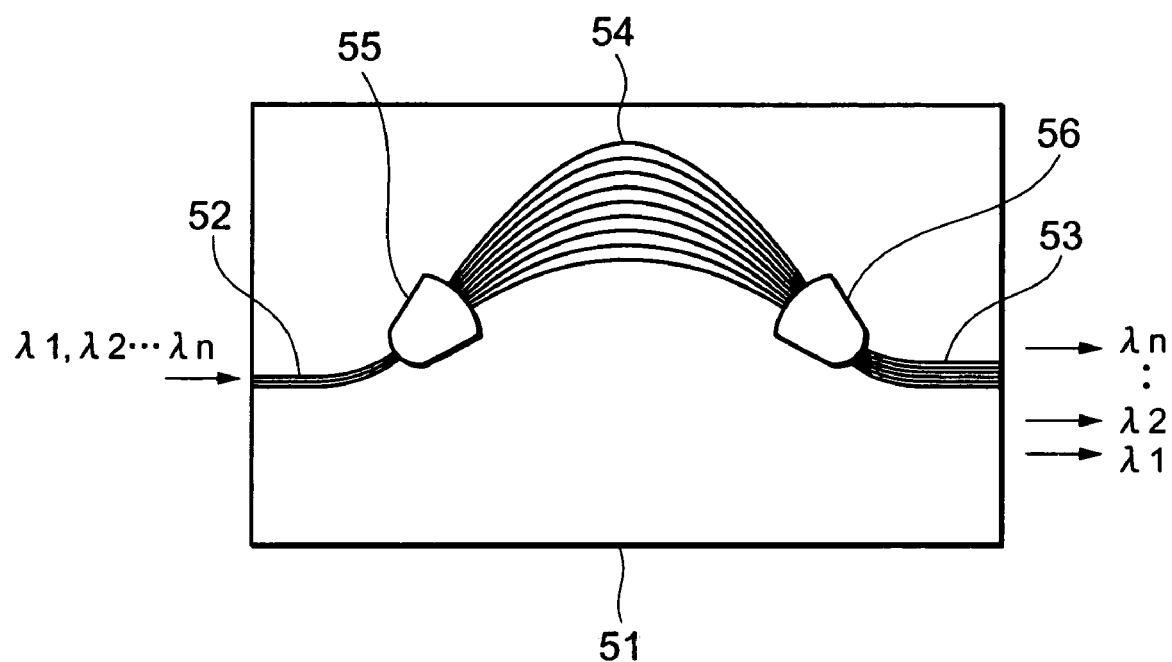
FIG. 1 is a plan view illustrating a basic structure of the array waveguide grating of the related art.
Figure 2:
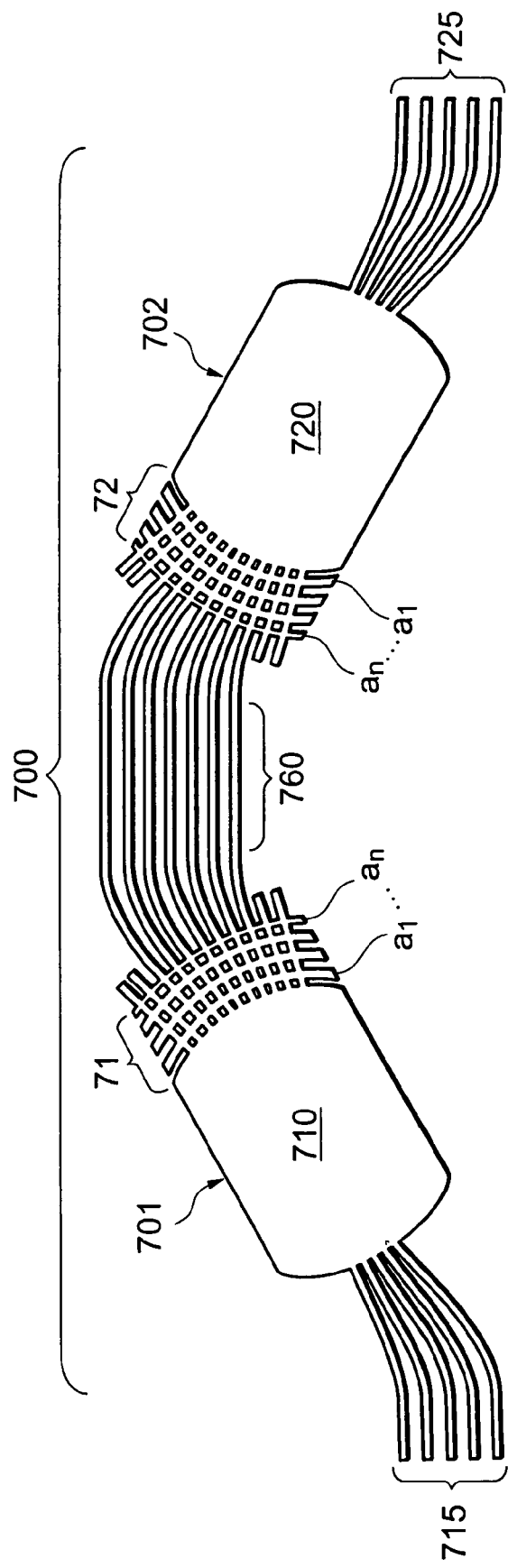
FIG. 2 is a plan view illustrating a low loss technique of the array waveguide grating of the related art.
Figure 3A:
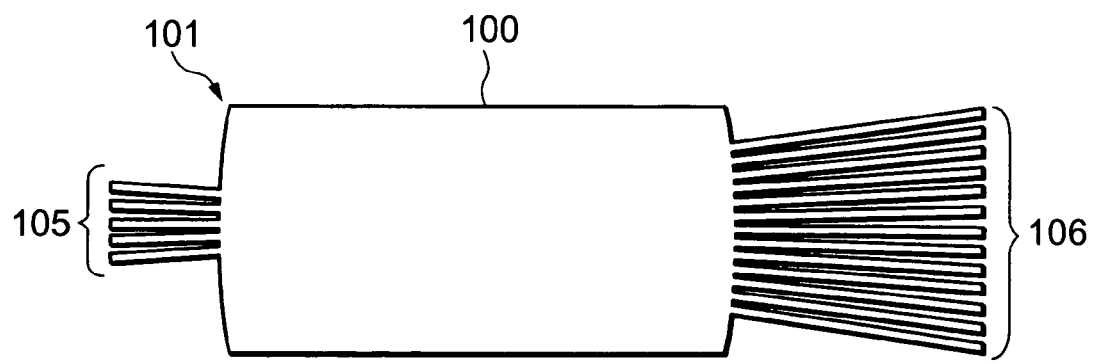
Figure 3B:
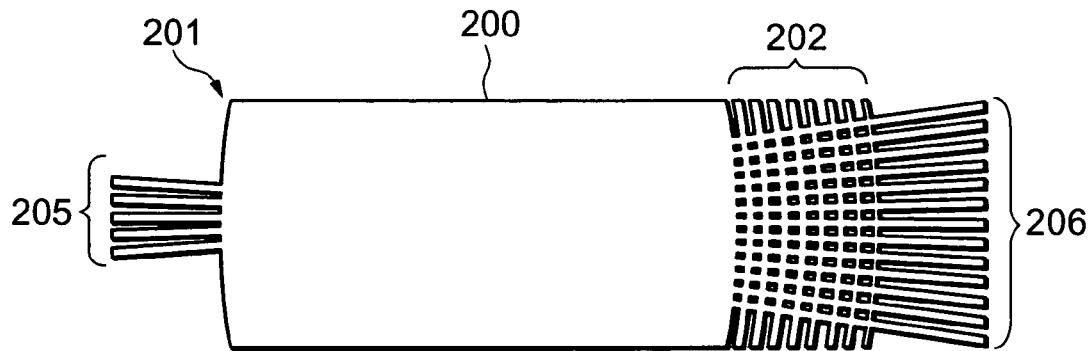
Figure 3C:
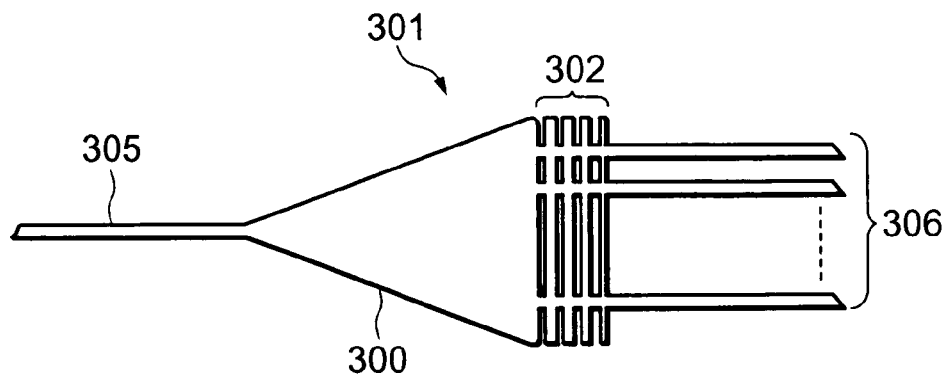
Figure 4:
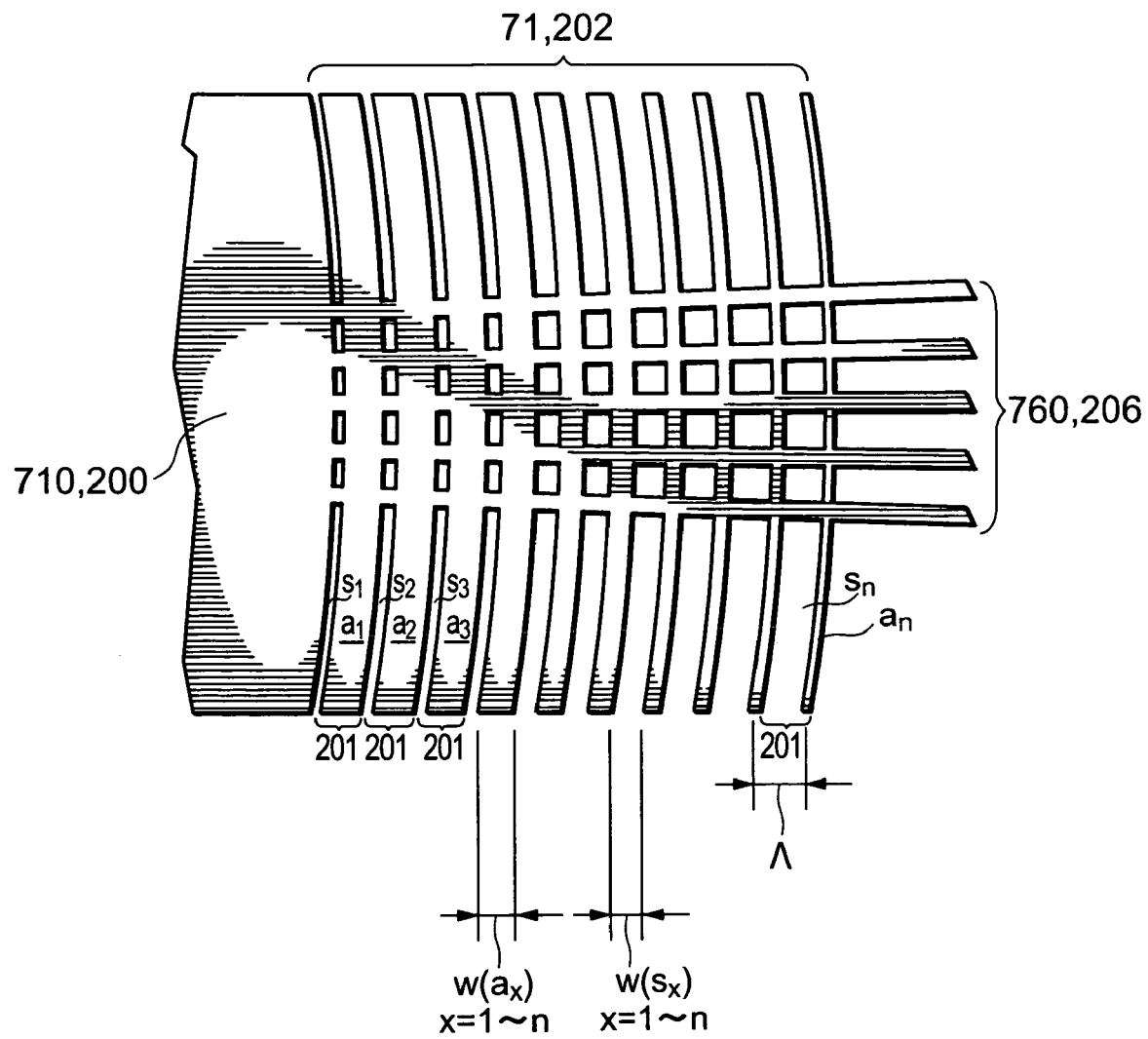
FIG. 4 is a plan view illustrating a transition region of the related art.
Figure 10:
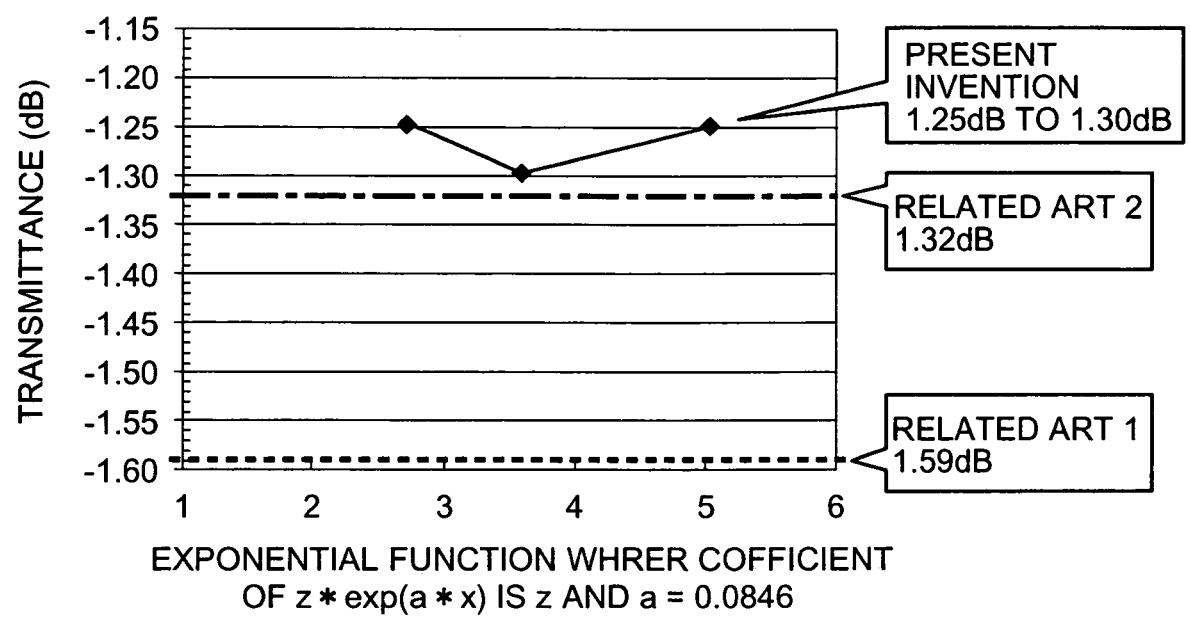
FIG. 10 is a characteristic diagram illustrating effect of the low loss technique using the array waveguide grating of the first exemplary embodiment of the present invention.

FIG. 10 is a characteristic diagram showing the effect of low optical loss realized by the array waveguide grating of the first exemplary embodiment. The first exemplary embodiment shows an example of design in which the width W of waveguide path shown in FIG. 7 is 6 μm and the period $\Lambda(a_x)$ shown in FIG. 8B increases in accordance with an exponential function $Z*\exp(0.0846*x)$. Wherein, Z is a coefficient of an exponential function and is indicated by the horizontal axis in FIG. 10. For the comparison, the basic design example (waveguide path is not provided) shown in FIG. 1 is illustrated as the related art 1, whereas a proposed example (waveguide paths are provided in the constant period) of low optical loss shown in FIG. 2 is illustrated as the related art 2. As a result, the first exemplary embodiment of the present invention surely attains the effect of low optical loss of 0.3 to 0.35 dB which is lower than that of the related art 1 where the waveguide path is not provided. In addition, the first exemplary embodiment of the present invention attains further effect of low optical loss in comparison with the related art 2 in which the waveguide paths are provided in the constant period.

Figure 11A:
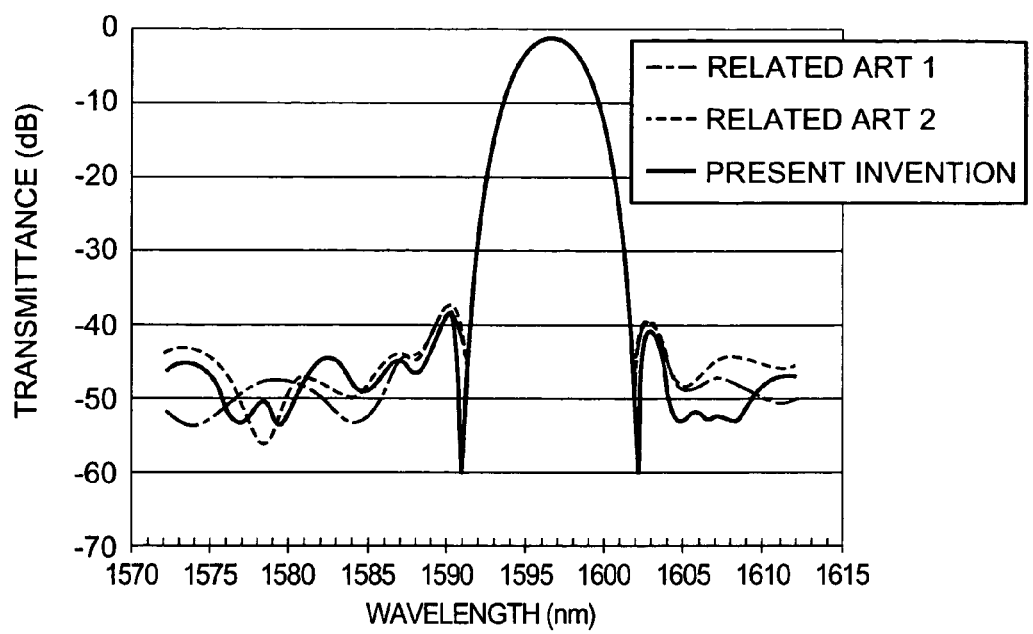
Figure 11B:
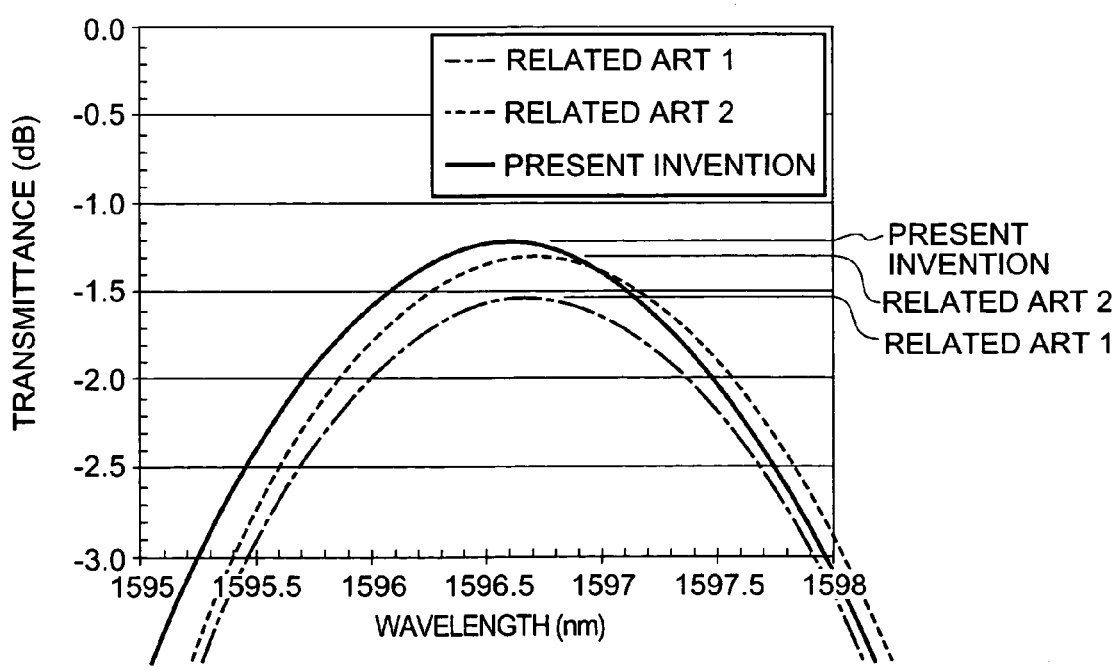

FIGS. 11A to 11B are transmissive spectrum diagrams showing the effects of low optical loss by the array waveguide grating of the first exemplary embodiment of the present invention. FIG. 11A illustrates the entire part of the transmissive spectrum and FIG. 11B is a magnified view of the shape of top of the main lobe. The shapes of spectrum illustrated in FIG. 11A are not different so much even in the related art 1, related art 2 and the first exemplary embodiment of the present invention. The transmissive spectrum diagram reveals that adverse influence, such as increase in crosstalk level to the other channels, is not generated because a side lobe is not generated in the first exemplary embodiment of the present invention. Moreover, it is also apparent from the magnified view of FIG. 11B that the first exemplary embodiment has attained further excellent low optical loss in comparison with the related arts 1 and 2. In the first exemplary embodiment, it can be confirmed that any distortion is not generated in the shape of top of the main lobe and moreover the width of the transmissive wavelength is never deteriorated. Accordingly, it is now possible to obtain low optical loss in the first exemplary embodiment without giving any adverse effect on the shape of top and the width of the transmissive wavelength or the like.

A star coupler as the second exemplary embodiment of the present invention will then be explained below.

Figure 12A:
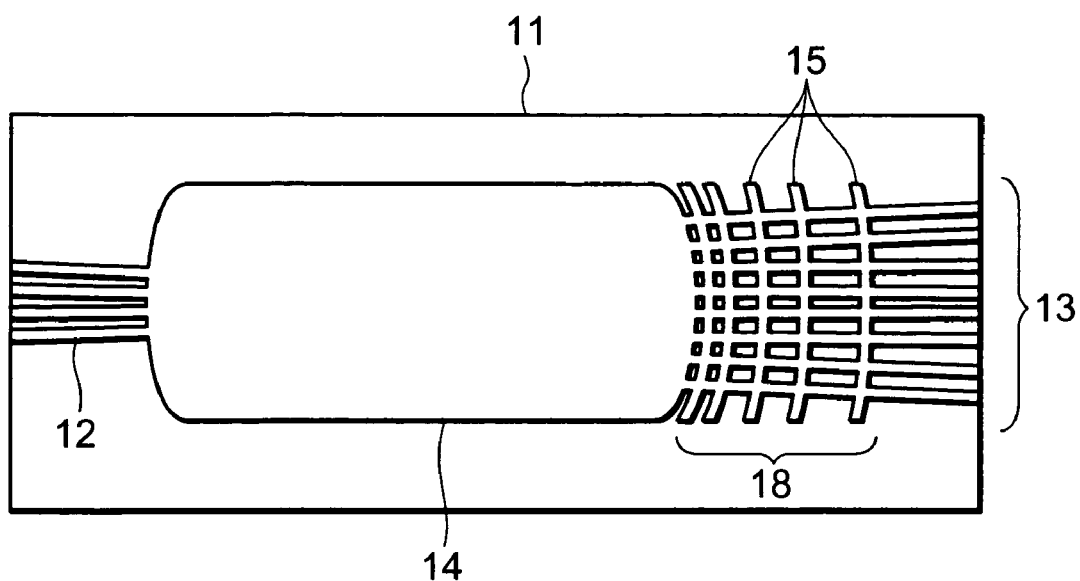

FIG. 12A is a plan view of a star coupler as the second exemplary embodiment of the present invention. A basic structure of the second exemplary embodiment is configured by forming, on a substrate 11, input waveguides 12, output waveguides 13, and a slab waveguide 14 for connecting the input waveguides 12 and output waveguides 13. In addition, a mesh type mode conversion region 18 is provided in the boundary between the output waveguides 13 and the slab waveguide 14. This mode conversion region 18 is formed under the condition that the output waveguides 13 intersect a plurality of waveguide paths 15. The mesh type structure is similar to that of the first exemplary embodiment as illustrated in (a) of FIG. 6. Accordingly, the characteristic which is similar to that of the first exemplary embodiment can be attained even in the star coupler of the second exemplary embodiment. In more practical, this second exemplary embodiment also results in the effects that low optical loss can be realized and wavelength dependence can also be lowered. In addition, shape management can be realized easily in the steps of manufacture and inspection.

Next, a splitter as the third embodiment of the present invention will then be explained below.

Figure 12B:
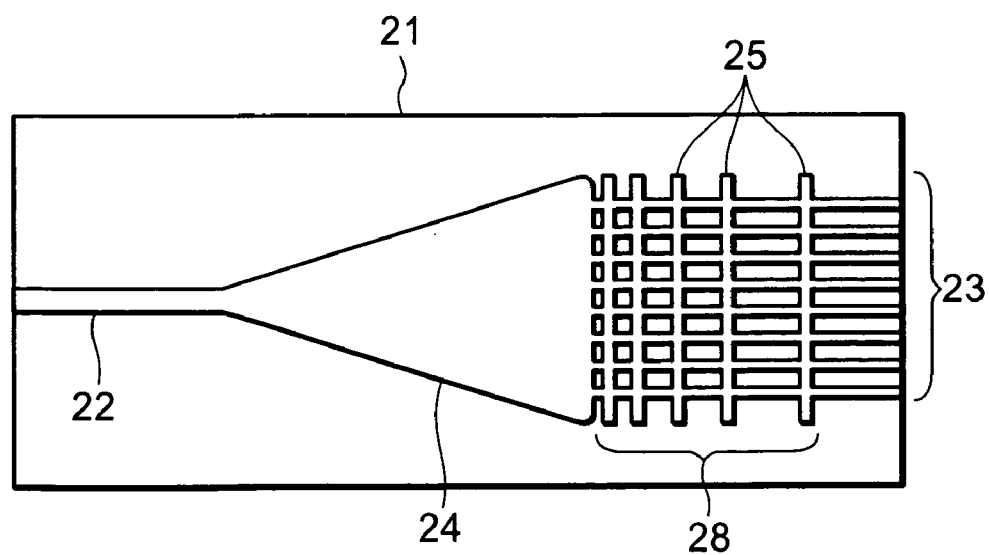

FIG. 12B is a plan view of a splitter as the third exemplary embodiment of the present invention. A basic structure of the third exemplary embodiment is configured by forming, on a substrate 21, an input waveguide 22, output waveguides 23, and a slave waveguide 24 for connecting the input waveguide 22 and the output waveguides 23. Moreover, a mesh type mode conversion region 28 is also provided in the boundary between the output waveguides 23 and the slab waveguide 24. This mode conversion region 28 is formed under the condition that the output waveguides 23 intersect a plurality of waveguide paths 25. The mesh type structure is similar to that of the first exemplary embodiment and is illustrated in (a) of FIG. 6. Accordingly, the characteristic which is similar to that of the first exemplary embodiment can also be obtained even in the splitter as the third exemplary embodiment. In more practical, low optical loss can be realized and wavelength dependence can also be lowered. In addition, shape management can be realized also easily in the steps of manufacture and inspection.

An example of the optical waveguide module of the present invention will then be explained.

Figure 13A:
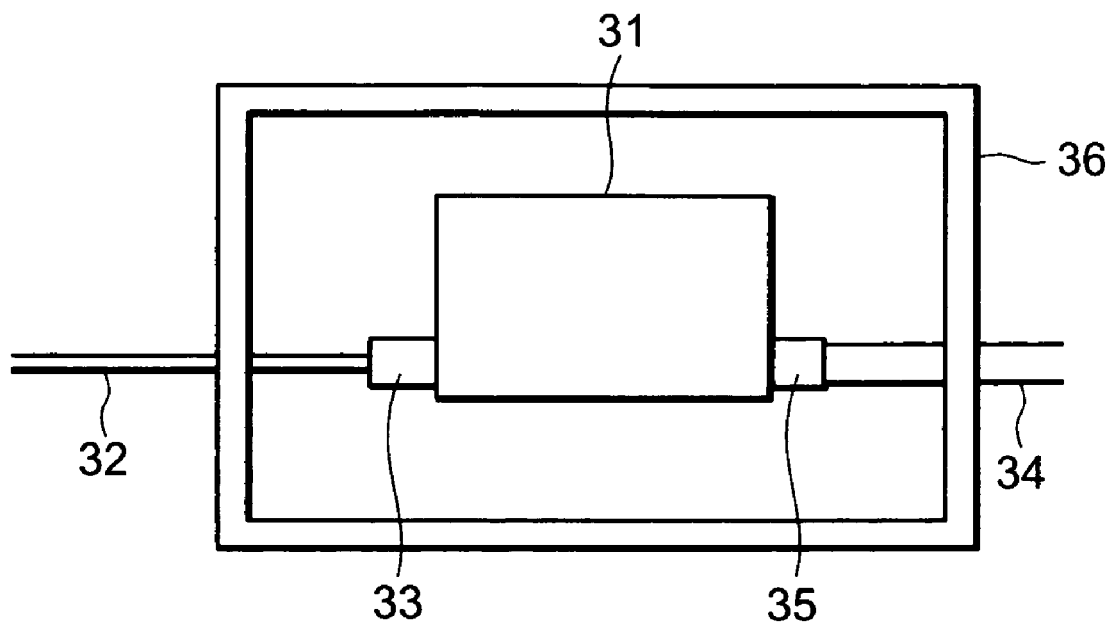
Figure 13B:
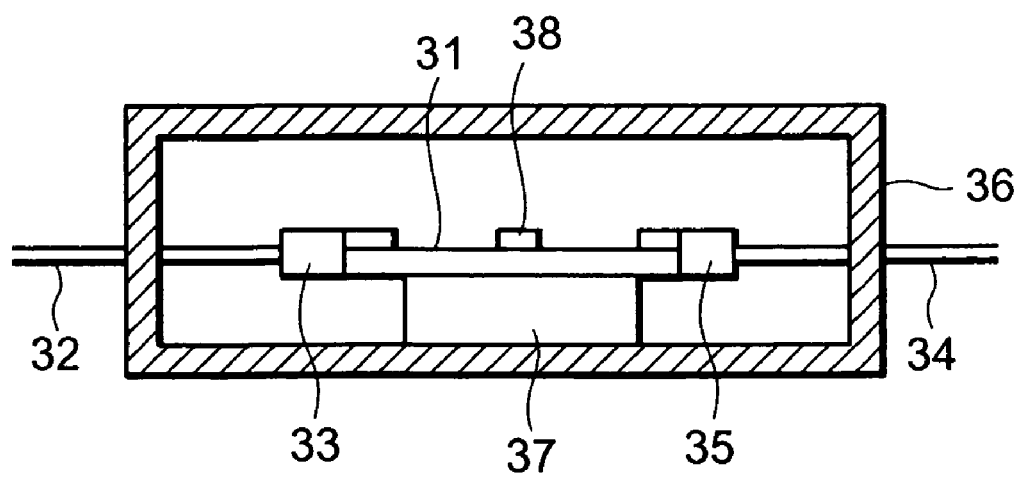

FIGS. 13A to 13B are diagrams illustrating an example of structure of the array waveguide grating module of the first exemplary embodiment of the present invention. FIG. 13A is a plan view and FIG. 13B is a side elevation diagram of the case cut along the cutting line. This array waveguide grating type optical module is formed by connecting, on a substrate 31 on which an array waveguide grating is formed, an input optical fiber 32 for inputting the wavelength-multiplexed optical signals, a fiber array 33 for connecting the same, an output optical fiber 34 for outputting individual wavelength-multiplexed optical signals and a fiber array 35 for connecting the same. These elements are housed in a case 36. Moreover, a temperature control device 37 for controlling temperature and a temperature detecting device 38 for detecting temperature are provided on the substrate 31. As the temperature control device, a Pertier element or a heater is used. As the temperature detecting device, a thermistor or a platinum resistance is used. The substrate 31 is controlled to a constant temperature with these elements. Accordingly, the center wavelength of each of the wavelength-multiplexed optical signals is kept to the constant value. Here, it is also possible to input the individual wavelength optical signals from the output optical fiber 34 and output the wavelength-multiplexed optical signals from the input optical fiber 32 by using in reversible this optical module.

Moreover, the optical waveguide type module can also be obtained through the assemblies even in the second and third exemplary embodiments. In this case, the module is also provided, like the FIGS. 13A and 13B, with the input optical fiber, output optical fiber, and case. However, the temperature control device and temperature detecting device may be eliminated.

The exemplary embodiments of the present invention have been explained above but the present invention also allows various combination of these structures and modification of a part of these structures.

As explained above, the optical waveguide device and optical waveguide module of the present invention provide the effects described below.

The optical waveguide device and optical waveguide module of the present invention can provide the effect which can reduce wavelength dependence by keeping constant the width of waveguide path and changing the width of separation gap or the period of arrangement interval. Moreover, the present invention can provided the effect that optical coupling loss can also be reduced more than the related art because the wide waveguide path is not provided unlike the related art. It is also possible to provide the effect that shape management can be realized easily even in the manufacturing process and inspection process because the width of waveguide path is constant.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. An optical waveguide device comprising:
a substrate;
one or more first waveguides arranged on said substrate;
a plurality of second waveguides arranged on said substrate; and
a slab waveguide arranged on said substrate to connect said first waveguides and said second waveguides,
wherein said second waveguides are provided with a plurality of waveguide paths for connecting said second waveguides respectively at the region close to said slab waveguide; and
width of each of said waveguide paths is constant and the width of separation gap between said adjacent waveguide paths progressively increases as it becomes further away from said slab waveguide.

2. An optical waveguide device comprising:
a substrate;
one or more first waveguides arranged on said substrate;
a plurality of second waveguides arranged on said substrate; and
a slab waveguide arranged on said substrate to connect said first waveguides and said second waveguides;
wherein said second waveguides are provided, at the region close to said slab waveguide, with a plurality of waveguide paths for connecting said second waveguides respectively; and
width of each of said waveguide paths is constant and the period in arrangement interval of said waveguide paths progressively increases as it becomes further away from said slab waveguide.

3. The optical waveguide device according to claim 2 satisfies the relationship $\Lambda(a_x)-W(s_x)=W$, $x=1$ to $n$, wherein said width of each of said waveguide paths is W, width of separation gap between said adjacent waveguide paths is $W(s_x)$, and said period is $\Lambda(a_x)$.

4. The optical waveguide device according to claim 2, wherein said period progressively increases linearly for the distance from said slab waveguide.

5. The optical waveguide device according to claim 2, wherein said period progressively increases in accordance with an exponential function for the distance from said slab waveguide.

6. The optical waveguide device according to claim 2, wherein said period progressively increases in accordance with an n-th order function (n is a positive integer) for the distance from said slab waveguide.

7. The optical waveguide device according to claim 1, wherein said width of each of said waveguide paths is within the range of 50% to 150% of the width of said second waveguides.

8. The optical waveguide device according to claim 2, wherein said width of each of said waveguide paths is within the range of 50% to 150% of the width of said second waveguides.

9. An optical waveguide device comprising:
a substrate;
one or more first waveguides arranged on said substrate;
a channel waveguide array arranged on said substrate with a plurality of waveguides and formed so that length of each waveguide sequentially becomes longer with the predetermined difference in the length of waveguides;
a plurality of second waveguides arranged on said substrate;
a first slab waveguide arranged on said substrate to connect said first waveguides and said channel waveguide array; and
a second slab waveguide arranged on said substrate to connect said channel waveguide array and said second waveguides,
wherein said channel waveguide array is provided with a plurality of waveguide paths for connecting waveguides of said channel waveguide array respectively at least one of the regions close to said first slab waveguide and said second slab waveguide, and
width of each of said waveguide paths is constant and width of separation gap between said adjacent waveguide paths progressively increases as it becomes further away from said slab waveguide of the side arranged said waveguide paths.

10. An optical waveguide device comprising:
a substrate;
one or more first waveguides arranged on said substrate;
a channel waveguide array arranged on said substrate with a plurality of waveguides and formed so that length of each waveguide sequentially becomes longer with the predetermined difference in the length of waveguides;
a plurality of second waveguides arranged on said substrate;
a first slab waveguide arranged on said substrate to connect said first waveguides and said channel waveguide array; and
a second slab waveguide arranged on said substrate to connect said channel waveguide array and said second waveguides,
wherein said channel waveguide array is provided with a plurality waveguide paths for connecting waveguides of said channel waveguide array respectively at least one of the regions close to said first slab waveguide and said second slab waveguide; and width of each of said waveguide paths is constant and period in arrangement interval of said waveguide paths progressively increases as it becomes further away from said slab waveguide of the side arranged said waveguide paths.

11. The optical waveguide device according to claim 10 satisfies the relationship $\Lambda(a_x)-W(s_x)=W$, x=1 to n,
wherein said width of each of said waveguide paths is W, width of separation gap between said adjacent waveguide paths is W(sx), and said period is $\Lambda(a_x)$.

12. The optical waveguide device according to claim 10, wherein said period progressive increases linearly for the distance from said slab waveguide.

13. The optical waveguide device according to claim 10, wherein said period progressively increases in accordance with an exponential function for the distance from said slab waveguide.

14. The optical waveguide device according to claim 10, wherein said period progressively increases in accordance with an n-th order function (n is a positive integer) for the distance from said slab waveguide.

15. The optical waveguide device according to claim 9, wherein said width of each of said waveguide paths is within the range of 50% to 150% of the width of said second waveguides.

16. The optical waveguide device according to claim 10, wherein said width of each of said waveguide paths is within the range of 50% to 150% of the width of said second waveguides.

17. The optical waveguide device according to claim 9, wherein said waveguide paths are provided in both near regions where said channel waveguide array is connected to said first slab waveguide and to said second slab waveguide.

18. The optical waveguide device according to claim 10, wherein said waveguide paths are provided in both near regions where said channel waveguide array is connected to said first slab waveguide and to said second slab waveguide.

19. An optical waveguide module comprising:
the optical waveguide device of claim 1;
one or more first optical fibers connected to said first waveguides;
a plurality of second optical fibers connected to said second waveguides; and
a case for housing these elements.

20. An optical waveguide module comprising:
the optical waveguide device of claim 2;
one or more first optical fibers connected to said first waveguides;
a plurality of second optical fibers connected to said second waveguides; and
a case for housing these elements.

21. An optical waveguide module comprising:
the optical waveguide device of claim 9;
one or more first optical fibers connected to said first waveguides;
a plurality of second optical fibers connected to said second waveguides; and
a case for housing these elements.

22. An optical waveguide module comprising:
the optical waveguide device of claim 10;
one or more first optical fibers connected to said first waveguides;
a plurality of second optical fibers connected to said second waveguides; and
a case for housing these elements.

23. The optical waveguide module according to claim 21, further comprising:
a temperature detecting means for temperature detection of said substrate; and
a temperature control means for temperature control of said substrate.

24. The optical waveguide module according to claim 22, further comprising:
a temperature detecting means for temperature detection of said substrate; and
a temperature control means for temperature control of said substrate.

* * * * *